United States Patent [19]

Kasuga et al.

[11] Patent Number: 5,079,470
[45] Date of Patent: Jan. 7, 1992

[54] STANDING-WAVE TYPE ULTRASONIC MOTOR AND TIMEPIECE

[75] Inventors: Masao Kasuga; Nobuo Tsukada; Hiroshi Kitamura, all of Tokyo, Japan

[73] Assignee: Seiko Instruments Inc., Japan

[21] Appl. No.: 512,807

[22] Filed: Apr. 23, 1990

[30] Foreign Application Priority Data

Apr. 28, 1989 [JP] Japan .................................. 1-110450

[51] Int. Cl.$^5$ ............................................. H01L 41/08
[52] U.S. Cl. ..................................................... 310/323
[58] Field of Search .................................. 310/323, 328

[56] References Cited

U.S. PATENT DOCUMENTS

| | | | |
|---|---|---|---|
| 4,580,073 | 4/1986 | Okumura et al. | 310/323 |
| 4,739,212 | 4/1988 | Imasaka | 310/328 |
| 4,829,209 | 5/1989 | Kawasaki et al. | 310/328 X |
| 4,882,500 | 11/1989 | Iijima | 310/323 |

FOREIGN PATENT DOCUMENTS 0011073 1/1988 Japan ................................. 310/323

Primary Examiner—Mark O. Budd
Attorney, Agent, or Firm—Bruce L. Adams; Van C. Wilks

[57] ABSTRACT

A standing-wave type ultrasonic motor utilizing flexible standing-wave components. Protuberances are provided nearly at every other intermediate positions of the loops and the nodes of flexible standing-waves generated in the vibration member by the piezo-electric element or the electro-strictive element, and a moving member is brought into pressed contact with the protuberances so as to be frictionally driven. A standing-wave type ultrasonic motor is driven in the forward direction and in the reverse direction while fulfilling the reduction in size, stabilization in performance and improvement in efficiency.

Furthermore, an analog-type electronic timepiece is obtained using display means that is driven by the standing-wave type ultrasonic motor, featuring reduced size and thickness.

31 Claims, 11 Drawing Sheets

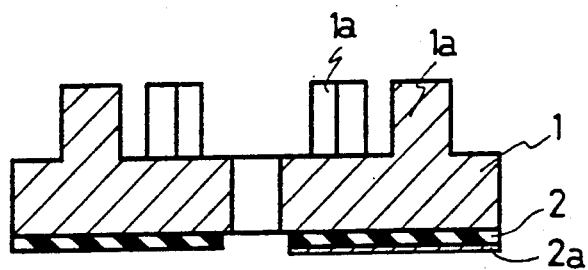
FIG.1(a)
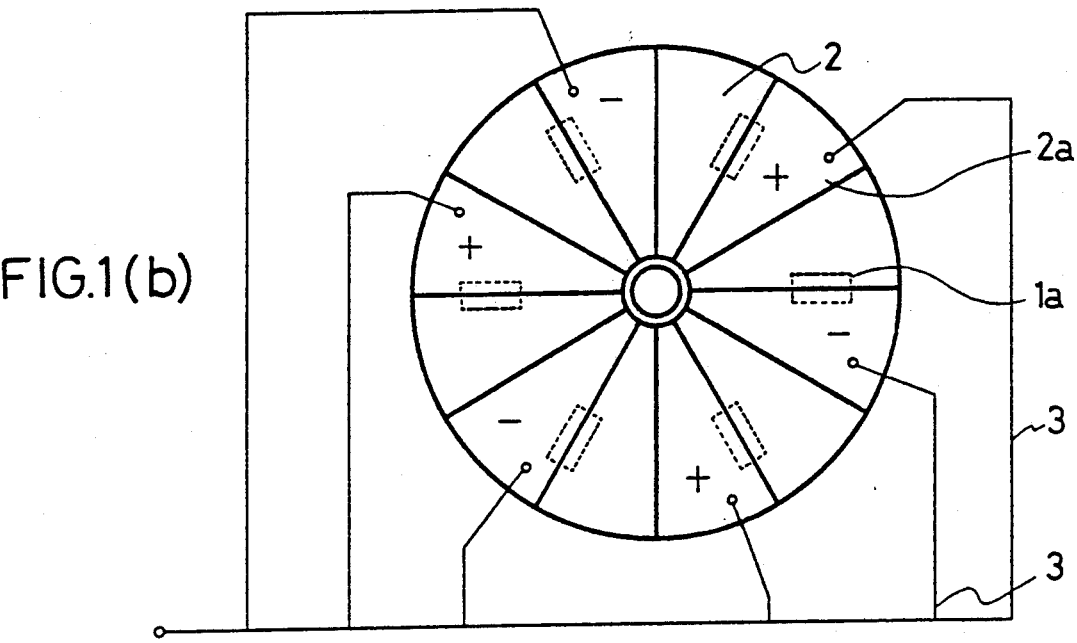
FIG.1(b)
FIG. 2 PRIOR ART
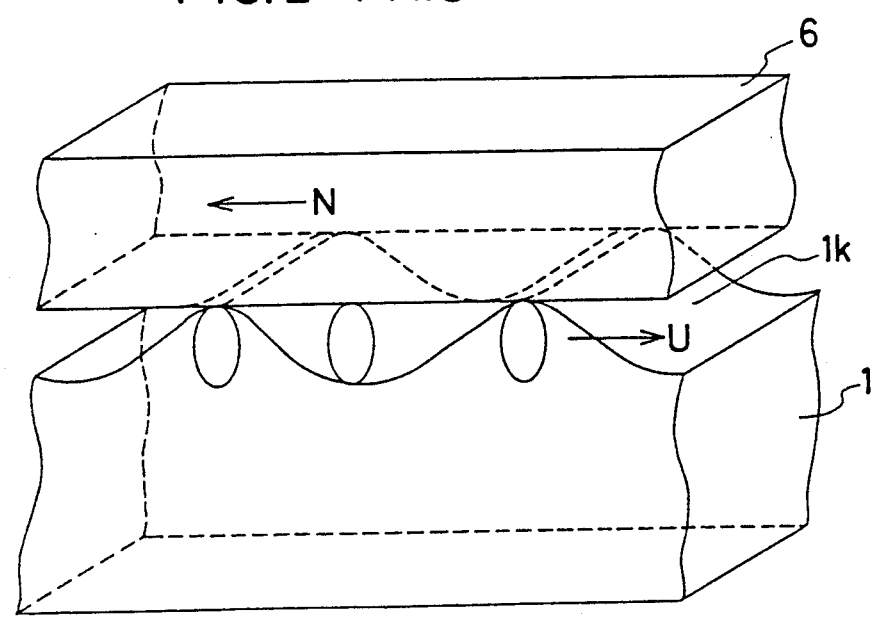

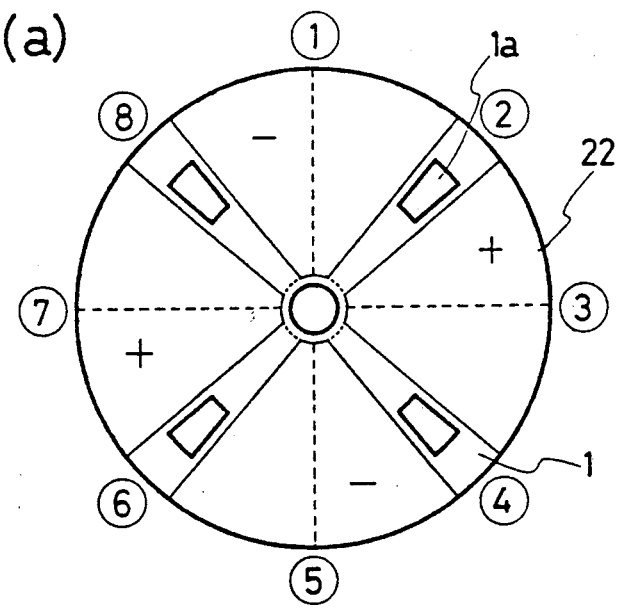
FIG. 10(a)
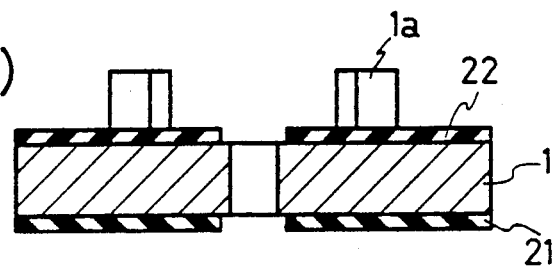
FIG. 10(b)
FIG. 11
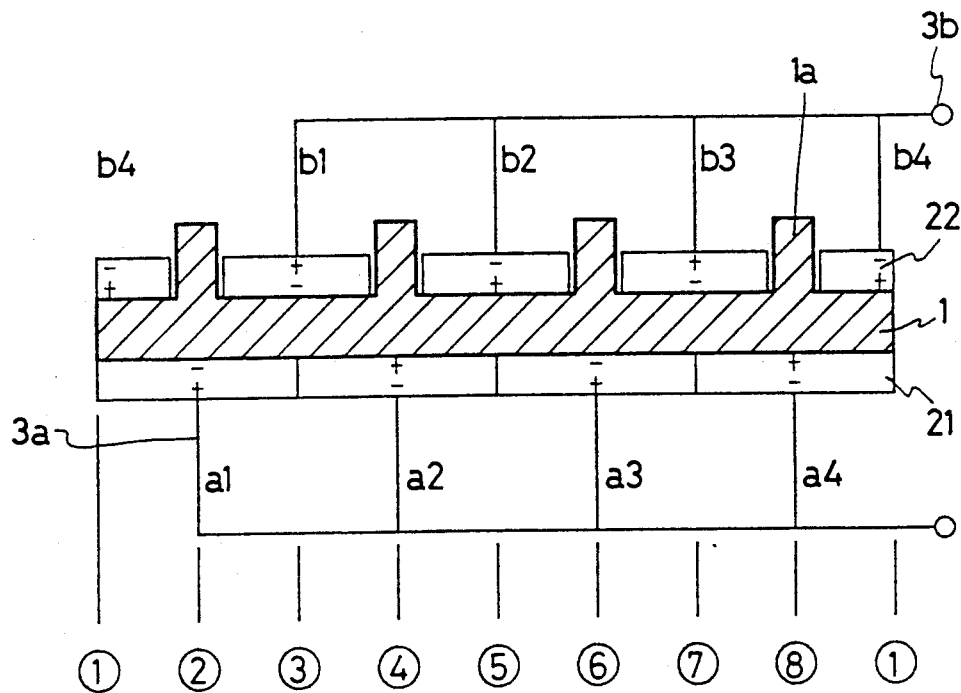

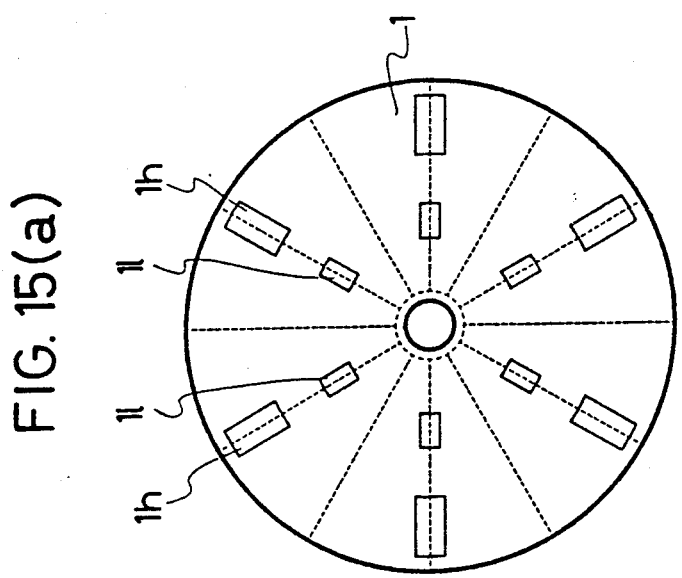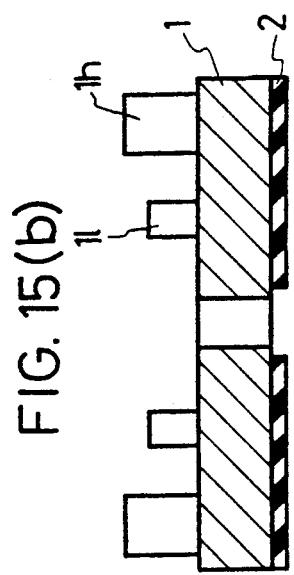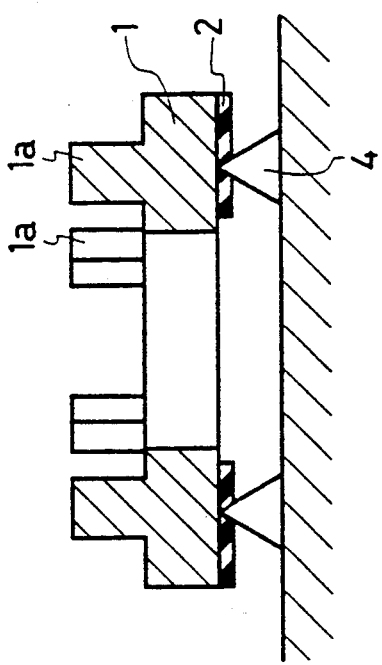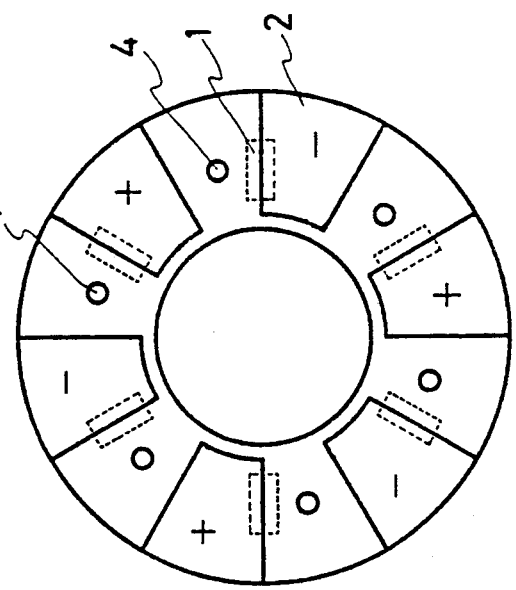

STANDING-WAVE TYPE ULTRASONIC MOTOR AND TIMEPIECE

BACKGROUND OF THE INVENTION

The present invention relates to an ultrasonic motor that generates a driving force utilizing the piezo-electric action or the electrostrictive action of a piezo electric element or an electrostrictive element. More specifically, the invention relates to an ultrasonic motor utilizing standingwaves and to an analog-type electronic timepiece using the ultrasonic motor.

Two types of the ultrasonic motor are conventionally known. One is a standing-wave type motor which employs a Langevin oscillator as a driving source. Such type of motor is disclosed in U.S. Pat. No. 4,019,073. The other is a travelling-wave type motor employing travelling-wave generated on a stator for driving a rotor provided on the stator.

Such travelling-wave motor is disclosed in U.S. Pat. No. 4,513,219 to Katsuma et al., U.S. Pat. No. 4,562,374 to Sashida and European Pat. Appl. Pub. No. 169297 of Tokushima. Katsuma et al. and Sashida disclosed the travelling-wave motor employing a ring type of a piezo-electric member. This type of travelling-wave motor essentially consists of an annular vibration member and a moving member provided thereon. The principle of a conventional wave-type ultrasonic motor is shown in graphic form in FIG. 2. The vibration member has an annular piezo-electric element thereon. The vibration member is fixed to a base through a support mechanism. On the annular type piezoelectric element, a gap portion with the length of half of the arc of an electrode is provided between two electrode groups. The travelling-wave is propagated by applying and AC signal having a phase difference of 90° to the two groups.

A pressure-regulating mechanism is provided on the central shaft for making a suitable contact pressure between the vibration member and the moving member to efficiently conduct the travelling-wave component to the moving member. The vibration member is supported and fixed on two circular protrusions formed on a base. The disk-shaped piezo-electric element consists of a plurality of segments interposed in such a manner that the piezo-electric element slips by a half pitch of the arc length, the piezo-electric element having an even number of electrodes in the circumferential direction in such a manner that each electrode has the same arc length.

Other conventional structures have been disclosed in, for example, Japanese Patent Laid-Open Nos. 148682/1983, 183981/1985, 207466/1985, 207469/1985 and "Ultrasonic Motor Utilizing Standing Waves of Bent Ring", Treatise of the Japanese Association of Acoustics, Tomikawa et at., Yamagata University, March, 1988.

A ring shaped vibration member has plural protuberances. A piezo-electric element is adhered to other side of the plane of the protuberances. When a high frequency voltage is applied to the piezo-electric element, the vibration member vibrates such a condition that the node of the vibration is brought to the bottom of the protuberances of the vibration member. Consequently, one of two tips of a protuberance rises higher than the other tip.

A moving member contacts to the protuberances of the vibration member in a suitable contact pressure. The vibration member deforms to rotate the moving member. This type of ultrasonic motor can rotate the moving member to the only one direction.

In the case of the travelling-wave type ultrasonic motor shown in FIG. 2 based on the above-mentioned ultrasonic motor structure, two high frequency voltages of dissimilar phases are necessary to generate progressive waves in the vibration member 1. For this purpose, therefore, there are required two booster circuits and two drive circuits making it difficult to realize the device in small size which must also include control circuits. Further, since the vibration member always comes in contact with the moving member 6 at wave front portions having the greatest vertical amplitude component, the device is readily affected by a change in the pressing force between the vibration member 1 and the moving member 6.

Further, in the case of the standing-wave type ultrasonic motor shown in FIG. 3, there is provided an advantage in that support is obtained at nodal portions of the standing-waves generated in the vibration member 1 and the piezo-electric element 2. However, the motion is obtained in one direction only. Even in the case of the ring-type vibration member 1 shown in FIG. 3, the drive force is not obtained in both the forward direction and the reverse direction.

Japanese Patent Laid-Open Nos. 183981/1985, 207466/1985 and 207469/1985 disclose standing-wave type ultrasonic motors without, however, clarifying the positions of protuberances 1a that are provided at the contacting portions of the vibration member 1 and the moving member 6. Moreover, stable motor characteristics are not obtained and the driving force is not obtained in both the forward and reverse directions.

FIG. 20 is a vertical sectional view illustrating a conventional analog-type electronic timepiece.

A stator 53 is placed on the upper surface of a main plate 40, and a coil core 52 in contact with the upper surface of the stator 53 is fastened thereto by a screw. A coil wire 51a is wound on the coil core 52 and is wired to a drive control circuit that is not shown.

A rotor 54 is rotatably incorporated in a rotor hole 53a of the stator 53, and rotation of the rotor 54 is transmitted to a fifth wheel 55, to a fourth wheel 44, to a third wheel 43, to a minute wheel 42, to another minute wheel that is not shown, and to an hour wheel 45.

When a predetermined voltage is applied to the coil wire 51a at a predetermined cycle, the rotor 54 is rotated by the magnetic force of the stator 53, such that an hour hand 32 attached to the hour wheel 45 indicates the hours, a minute hand 33 attached to the minute wheel indicates the minutes, and a second hand 34 attached to the fourth wheel indicates the seconds.

SUMMARY OF THE INVENTION

A first object of the present invention therefore is to solve the above-mentioned problems and to provide a standing-wave type ultrasonic motor of high performance which is simple in construction, small in size despite that a control circuit is included, and which can be driven in both the forward and reverse directions.

A second object of the present invention is to provide an analog-type timepiece using a standingwave type ultrasonic motor.

In order to solve the above problems according to the present invention, a cyclic voltage is applied to a vibration member which consists of a piezoelectric element or an electrostrictive element to generate flexible standing-waves, protuberances are provided nearly at every other intermediate positions between the loops and the nodes of the flexible standingwaves generated in the vibration member, and a moving member is brought into pressed contact with the protuberances to be frictionally driven it. Thus, the standing-wave type ultrasonic motor is realized in a small size and is driven in the forward and reverse directions featuring stabilized performance and improved efficiency.

According to the above-mentioned constitution in which the piezo-electric element or the electrostrictive element is suitably segmented or electrode patterns are provided so that homogeneous standingwaves will generate and protuberances are simply provided nearly at every other intermediate positions of the loops and the nodes of the standing-waves, the piezo-electric element or the electrostrictive element to which a high frequency voltage is applied is switched causing the positional relationship of the loop and the node of standing-waves to be deviated by 90 degrees in phase. Therefore, there is obtained a standing-wave type ultrasonic motor having a moving member that can be driven in the reverse direction as well the forward direction. Further, since protuberances for driving the moving member are provided nearly at the intermediate positions between the loops and the nodes of standing-waves, it will be obvious that stable motor performance is obtained even for a change in the pressing force between the vibration member and the moving member or even for a variation in the contact areas thereof compared with that of the travelling-wave type ultrasonic motor in which the vibration member is in contact with the moving member always at the positions of the loops.

In the analog-type timepiece using the standing-wave type ultrasonic motor, a predetermined cyclic voltage is applied to the piezo-electric element from a drive control circuit, whereby the vibration member undergoes deformation and the moving member is rotated at a predetermined speed. The moving member rotates wheels at predetermined speeds. Thus, the time data can be indicated by attaching hands or pointer needles directly to the moving member or the wheels.

BRIEF DESCRIPTION OF THE DRAWINGS

FIG. 1 is a diagram of a vibration member of a standing-wave type ultrasonic motor according to an embodiment of the present invention;

FIG. 2 is a diagram illustrating the principle of a conventional progressive-wave type ultrasonic motor;

FIG. 10 is a diagram illustrating a vibration member according to a fifth embodiment of the present invention;

FIG. 11 is a diagram illustrating in cross section the vibration member according to the fifth embodiment of the present invention and the wiring therefor;

FIG. 14 is a diagram illustrating a vibration member according to a sixth embodiment of the present invention;

FIG. 15 is a diagram illustrating a vibration member according to a seventh embodiment of the present invention;

DETAILED DESCRIPTION OF THE PREFERRED EMBODIMENTS

Figure 4:
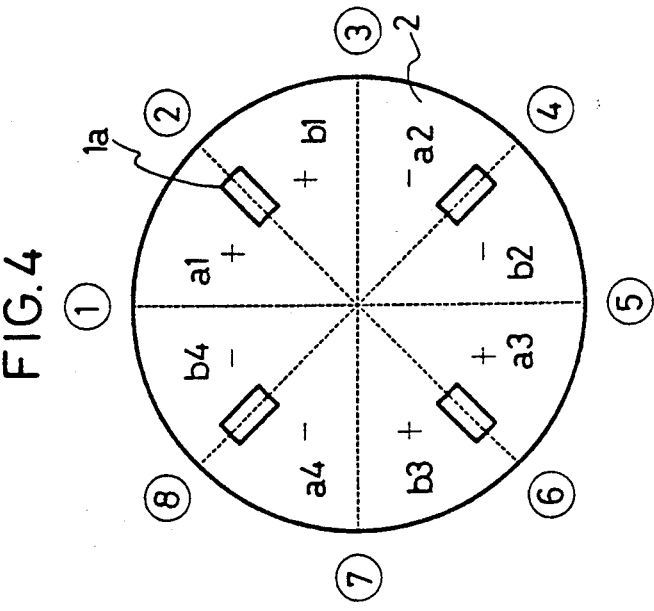
FIG. 4 is a diagram illustrating a vibration member according to a second embodiment of the present invention.

FIG. 1 is a diagram of vibration member of a standing-wave type ultrasonic motor according to a first embodiment of the present invention, wherein FIG. 1(a) is a section view and FIG. 1(b) is a back plan view. In order to excite standing-waves according to this embodiment, a piezo-electric element 2 is adhered onto one surface of a disc-like vibration or vibratory member 1 and is joined thereto by such a method as thin film forming means, such that the expansion-contraction motion in the peripheral direction of the piezoelectric element is converted into bending motion with the vibration member 1 and the piezo-electric element 2 as a unitary structure. According to this embodiment, the piezo-electric element 2 is divided into twelve segments in the circumferential direction and an electrode pattern 2a is formed on every other segment to effect the polarization as diagramed in order to excite three waves in the circumferential direction. In the drawing, the signs (+) and (−) indicate the directions of electrical polarization, i.e., (+) indicates the polarization when a positive electric field is applied to the side where the piezo-electric element 2 is joined to the vibration member 1, and (−) indicates, the polarization when a negative electric field is applied thereto. The piezo-electric element 2 may be obtained by forming electrode patterns 2a divided into 12 segments on a disc or obtained by arranging twelve fan-shaped piezo-electric elements on the disc. Here, a motion-converting member in the form of protuberance 1a is formed on every other one of the boundaries of the divided electrode patterns 2a which are connected together by lead wires 3 to apply thereto a high frequency voltage from a cyclic voltage generating unit, thereby to realize a standing-wave type ultrasonic motor as contemplated by the invention. Further, the same patterns as the electrode patterns 2a are formed on the portions of the piezo-electric element 2 that are not hatched, connected together, and the application of a cyclic voltage thereto is switched by switching means that is not shown to drive the motor in the reverse direction. The principle of drive will be described later. The vibration member 1 is made of an elastic material such as aluminum alloy, stainless steel, brass or like material, and the protuberances 1a may be formed as a unitary structure or separately. The positions for setting the protuberances 1a in the radial direction of the vibration member 1 are determined by what mode the vibration member is vibrated in the radial direction. In the case of the secondary mode, the protuberances should be located at positions of a maximum displacement of the inner peripheral portion and in the case of the primary mode, the protuberances should be located on the inside rather than the positions of a maximum displacement of the outer circumferential portion to obtain favorable motor characteristics.

Figure 5:
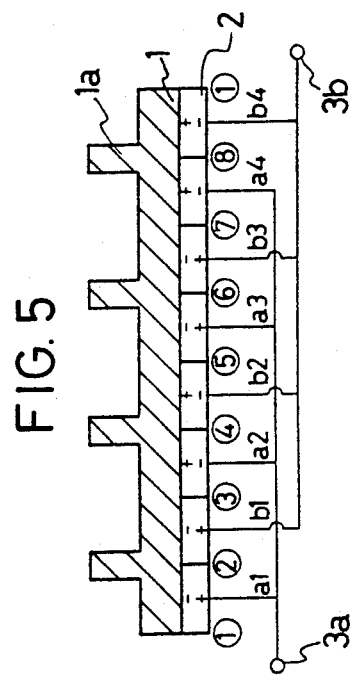
FIG. 5 is a diagram illustrating in cross section the vibration member according to the second embodiment of the present invention and the wiring therefor.
Figure 3A:
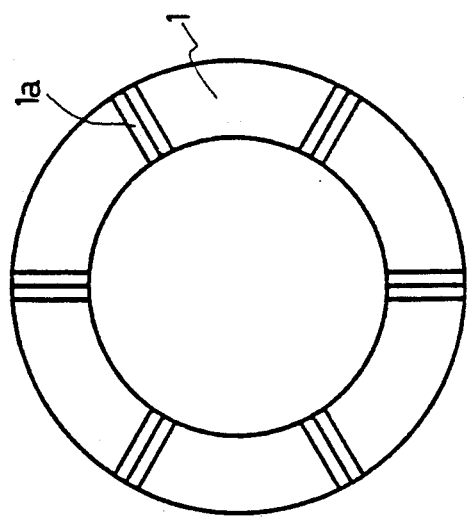
FIG. 3 is a diagram illustrating the principle of a conventional standing-wave type ultrasonic motor.
Figure 3B:
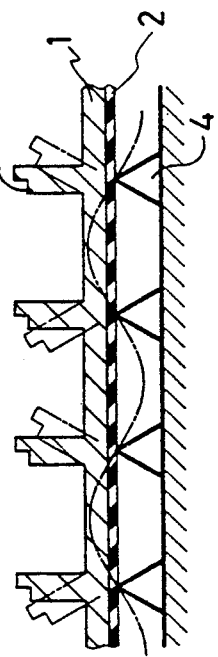

FIG. 4 illustrates a vibration member according to a second embodiment of the present invention, and FIGS. 5 and 6 explain the principle of operation based on the second embodiment.

In FIG. 4, the disc-like piezo-electric element 2 is equally divided into eight, the divided segments eight being denoted by a1, b1, a2, ---, b4 in order and being polarized as shown, the piezo-electric element being joined to the vibration member 1 that is not shown. For easy explanation, furthermore, boundaries of the divided segments are denoted by ①, ②, ---, ⑧ in order and protuberances 1a are provided on alternate boundaries ②, ④, ⑥ and ⑧. In this embodiment, two waves are excited in the circumferential direction.

FIG. 5 is a diagram showing in cross section the vibration member of the second embodiment of the present invention and the wiring thereof.

A lead wire 3a connects the thus divided piezo-electric elements a1, a2, a3, a4 together and a lead wire 3b connects the piezoelectric elements b1, b2, b3, b4 together. A cyclic voltage from a cyclic voltage generating unit is applied to the lead wire 3a or the lead wire 3b through switching means that is not shown such that the standing-waves excited in the vibration member 1 will have phases that are deviated by 90 degrees enabling the driving direction of the moving member not shown to be switched.

Figure 6A:
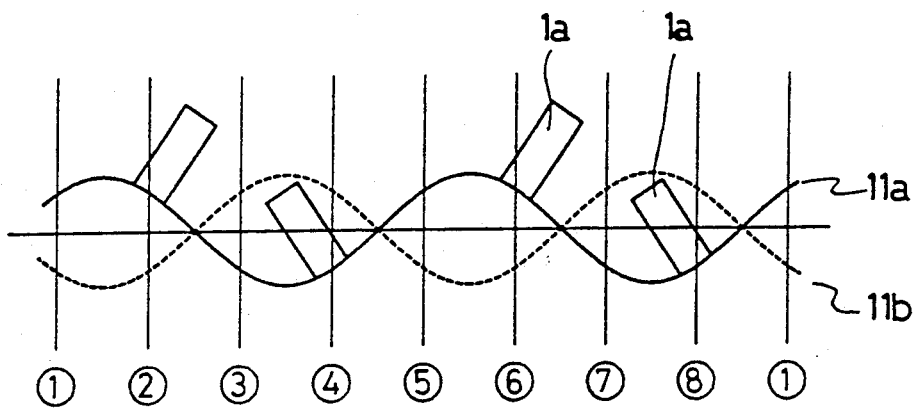
FIG. 6 is a diagram illustrating the principle of deformation of the vibration member according to the second embodiment of the present invention.
Figure 6B:
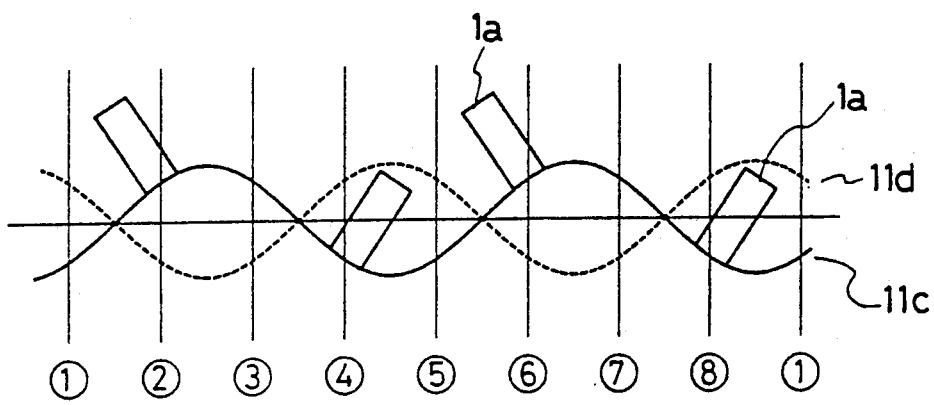

FIG. 6 is a diagram of the principle to explain the deformation of the vibration member of the second embodiment of the present invention, wherein FIG. 6(a) shows the case where the cyclic voltage is applied to the lead wire 3a of FIG. 5 to excite the piezoelectric elements a1, a2, a3 and a4 and the moving member is fed rightwards. The diagram FIG. 6(b) shows the case where the cyclic voltage is applied to the lead wire 3b to excite the piezo-electric elements b1, b2, b3 and b4 and the moving member is fed leftwards. That is, in the diagrams FIGS. 6(a) and (b), the excited standing-waves have loops and nodes (antinodal and nodal points) whose phases are deviated by 90 degrees relative to each other. Therefore, the locus of motion of the protuberances 1a can be reversed, making it possible to switch the driving direction of the moving member. Here, the rotation is based on the principle that as the tip of the protuberance 1a undergoes reciprocal motion toward the upper tilted direction, a very great acceleration is obtained at a moment when the protuberances 1a come in collision with the moving member 2 that is not shown and the components that contribute to driving the moving member 2 become effective. According to the present invention, the protuberances 1a that come into contact with the moving member are set at intermediate positions between the loops and the nodes of the waves eliminating the problems inherent in the conventional travelling-wave type ultrasonic motor such as a change in the pressing force between the vibration member and the moving member and poor stability in the performance when driven on small power since the vibration member is in contact with the moving member at the loop portions of the waves.

Figure 7:
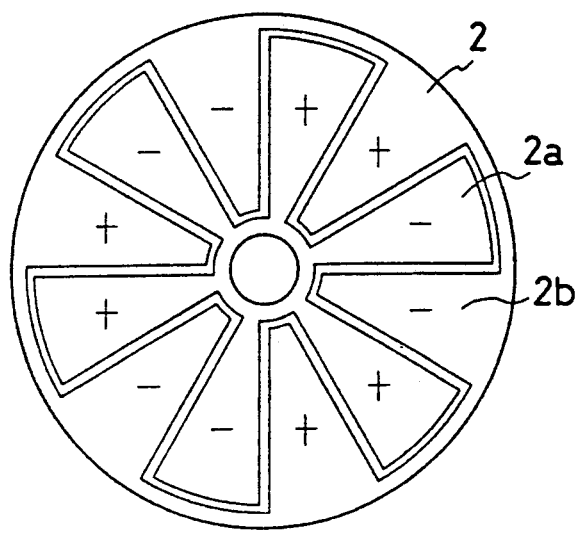
FIG. 7 is a diagram of electrode patterns of a piezo-electric element according to the first embodiment of the present invention.

FIG. 7 is a diagram of an electrode pattern of the piezo-electric element according to the first embodiment of the present invention, which is a concrete embodiment that can be adapted to the embodiments shown in FIGS. 1 and 4. That is, in the above embodiment, there exist the divided electrode patterns of a number two times as great as the desired number of waves to be excited in the circumferential direction and the connection must be made to every other one of the divided electrode patterns. The lead wires are generally attached by soldering or welding. When the lead wires are drawn from all of the divided electrode patterns, however, it is inevitable that vibration leaks and energy conversion losses increase and the production encounters inconvenience. In this embodiment, therefore, the electrode pattern divided into twelve segments is formed on the piezo-electric element 2 by thin film forming means such as vapor deposition, sputtering, or printing, and is then polarized as diagramed. Thereafter, connection is made to every other one of the segments or electrode patterns 2a by the thin film-forming means to obtain advantage from the standpoint of motor performance and production efficiency. According to this embodiment, two lead wires need be drawn at all times irrespective of the number of waves.

Figure 8A:
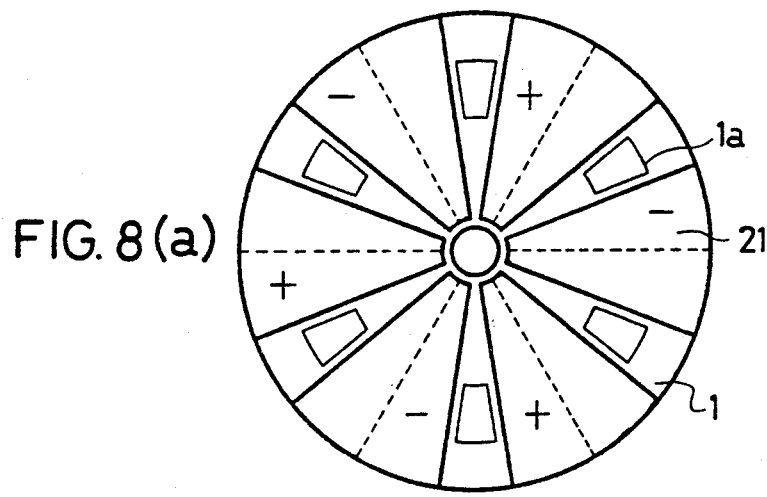
FIG. 8 is a diagram illustrating a vibration member according to a third embodiment of the present invention.
Figure 8B:
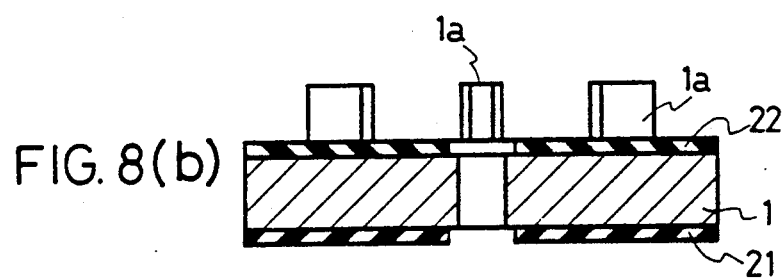

FIG. 8 illustrates a vibration member according to a third embodiment of the present invention, wherein FIG. 8(a) is a front plan view and FIG. 8(b) is a section view. In this embodiment, a piezo-electric element (A) 21 and a piezo-electric element (B) 22 are equally divided into six segments with the neighboring or adjacent ones thereof being oppositely polarized, and are joined together via the vibration member 1 in a manner that they are deviated by a half pitch. Under this condition, the protuberances 1a are arranged on the central portions of the segments of the piezo electric element (A) 21 and on the boundaries of the segments of the piezo-electric element (B) 22 in order to obtain the same effects as those of the foregoing embodiment. Details in relation to this will be described in conjunction with FIGS. 10 and 12.

Figure 9A:
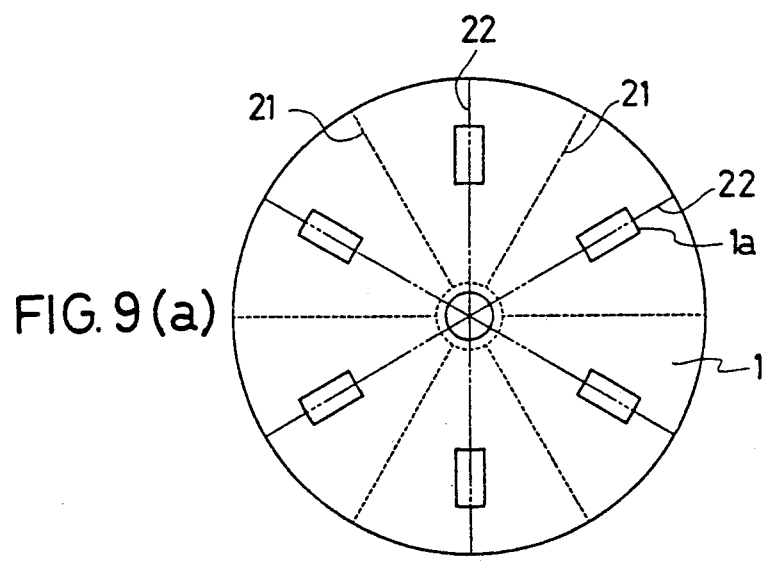
FIG. 9 is a diagram illustrating a vibration member according to a fourth embodiment of the present invention.
Figure 9B:
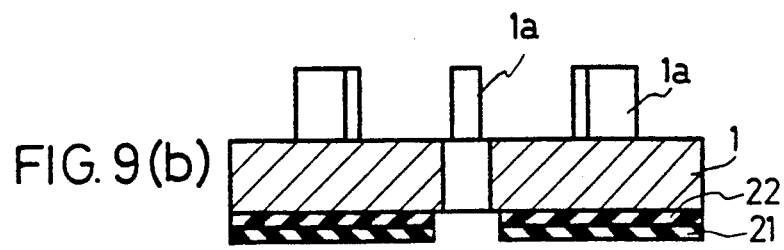

FIG. 9 illustrates a vibration member according to a fourth embodiment of the present invention wherein FIG. 9(a) is a front plan view and FIG. 9(b) is a section view like those of FIG. 8. In this embodiment, the piezo-electric element (A) 21 and the piezo-electric element (B) 22 are constituted in the same manner as those of FIG. 8. However, what makes a difference is that the piezo-electric element (B) 22 is not provided on the side of the protuberances 1a of the vibration member 1 but is laminated on the piezo-electric element (A) 21. The vibration member works based upon substantially the same principle as that of the vibration member of the third embodiment. FIGS. 8 and 9 illustrate the cases where the number of waves excited in the circumferential direction is three.

FIG. 10 illustrates a vibration member according to a fifth embodiment of the present invention, and FIGS. 11 and 12 explain the principle of operation according to the fifth embodiment. Even the embodiments shown in FIGS. 8 and 9 have the same principle and constitution but having a difference only in regard to the number of waves excited in the circumferential direction.

In FIG. 10, a piezo-electric element (A) 21 and a piezo-electric element (B) 22 in the form of a disc are each divided into four equal segments, the neighboring segments being oppositely polarized, and are joined together via the vibration member 1 in a manner that they are deviated by a half pitch. For easy explanation, the boundaries of segments of the piezo-electric element (A) 21 are denoted by ①, ③, ⑤, ⑦ in order and the boundaries of segments of the piezo-electric element (B) 22 are denoted by ②, ④, ⑥, ⑧ in order. Here, the protuberances 1a are formed on the boundaries ②, ④, ⑥, ⑧. In this embodiment, two standing-waves are excited in the circumferential direction of the vibration member 1. The piezo-electric element in the present invention forms electrode patterns maintaining a multiple of 4 and a nearly equal distance.

FIG. 11 is a diagram showing in cross section the vibration member according to the fifth embodiment of the present invention and the wiring thereof. By showing FIG. 10 in cross section, the above explanation will become more concrete. The divided electrode segments a1, a2, a3 and a4 of the piezoelectric element (A) 21 joined to the lower surface of the vibration member 1 under this condition are coupled together by a lead wire 3a, and the divided electrode segments b1, b2, b3 and b4 of the piezoelectric element (B) 22 joined to the upper surface of the vibration member 1 are coupled together by a lead wire 3b. The cyclic voltage from the cyclic voltage generating unit is applied through switching I means to the lead wire 3b in phase or in opposite phase relative to the lead wire 3a. Therefore, the standing waves excited in the vibration member have phases that are deviated by 90 degrees relative to each other, making it possible to switch the driving direction of the moving member that is not shown.

Figure 12A:
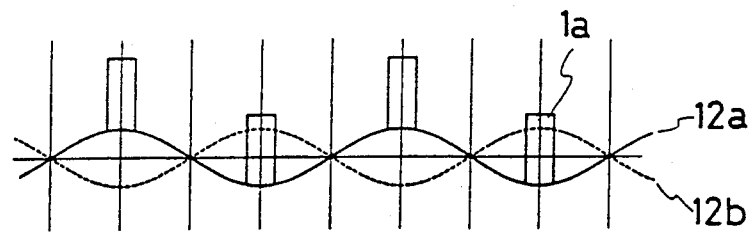
FIG. 12 is a diagram illustrating the principle of deformation of the vibration member according to the fifth embodiment of the present invention.
Figure 12B:
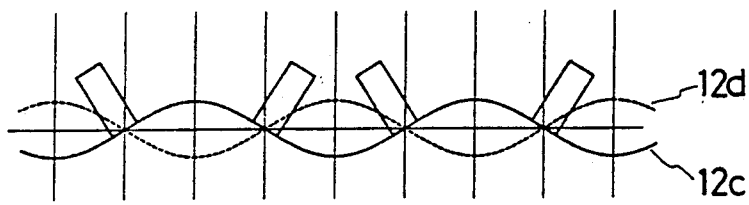
Figure 12C:
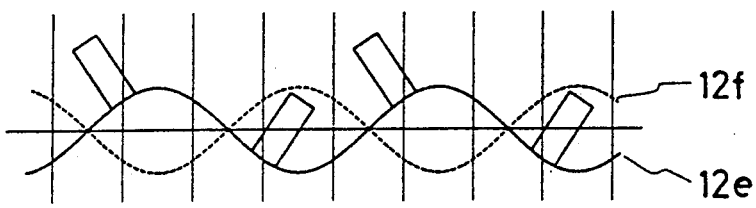
Figure 12D:
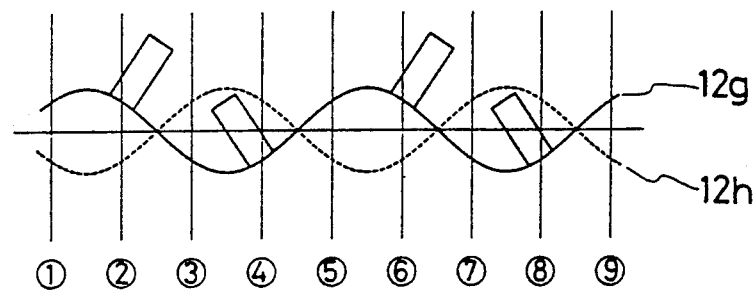

FIG. 12 is a diagram illustrating the principle of deformation of the vibration member of the fifth embodiment of the present invention, wherein FIG. 12(a) illustrates the case where a cyclic voltage is applied to the lead wire 3a of FIG. 11 to excite the piezo-electric elements a1, a2, a3 and a4. The protuberance 1a is developing displacement in the vertical direction. The diagram FIG. 12(b) illustrates the case where the cyclic voltage is applied to the lead wire 3b of FIG. 11 to excite the piezo-electric elements b1, b2, b3 and b4. The protuberance 1a is developing displacement in the lateral direction. Here, the diagram of FIG. 12(c) illustrates the case where the cyclic voltage applied to the lead wire 3a is in phase with the cyclic voltage applied to the lead wire 3b, and the diagram of FIG. 12(d) illustrates the case where these voltages have opposite phases relative to each other. The diagrams of FIGS. 12(c) and (d) are the ones in which the diagrams of FIGS. 12(a) and (b) are synthesized maintaining a phase difference and the protuberances 1a are arranged at every other intermediate position between the loops and the nodes of the excited standing-waves. Therefore, the standingwave type ultrasonic motor is realized based upon the substantially same principle as that of FIG. 6. In the diagram of FIG. 12(c), the moving member is fed toward the left and in the diagram of FIG. 12(d), the moving member is fed toward the right.

Figure 13:
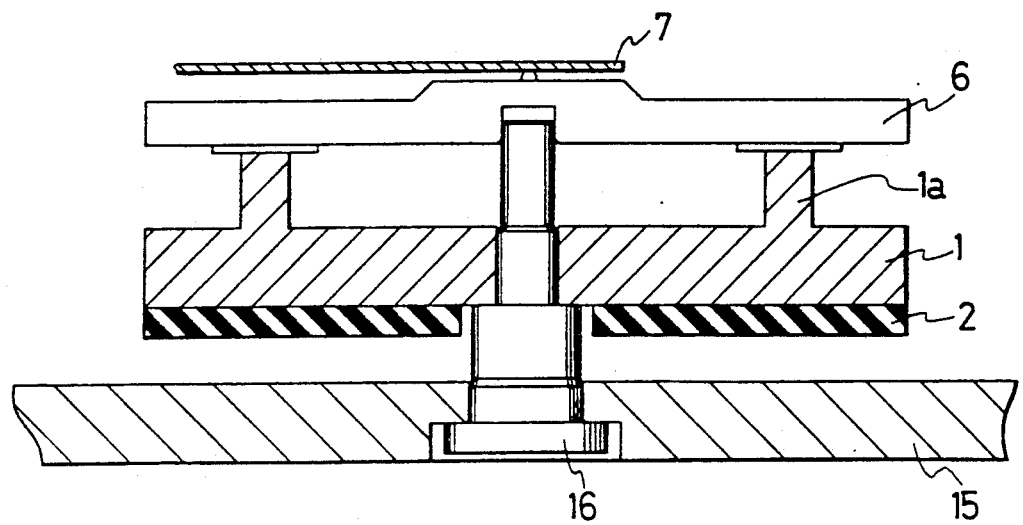
FIG. 13 is a section view of a standing-wave type ultrasonic motor according to the present invention.

FIG. 13 is a section view of the standing-wave type ultrasonic motor according to the present invention and illustrates a concrete constitution using the vibration or vibratory member of the embodiment of the present invention. A center shaft 16 is screwed or is drive-fitted into a support plate 15, and a vibration member 1 which is of the shape of a disc is fitted at its central portion to the center shaft 16 as a unitary structure. Here, the vibration member 1 is made of an elastic material such as aluminum alloy, stainless steel or brass and is supported substantially at its central portion by the center shaft 16. The center shaft 16 need not necessarily be of a unitary structure but may be of a two-body structure if consideration is given to determining the position at the time of adhering the piezoelectric element 2 to the vibration member 1. With the center shaft being made of an electrically conductive material, furthermore, the potential can be substantially equalized to that of the surface of adhesion enabling the wiring to be easily accomplished. The piezo-electric element 2 is one used for the vibration member of the first to fifth embodiments of the present invention, and is joined to at least either surface of the vibration member 1. A moving or movable member 6 rotates about the center shaft 16 and is so arranged as to come into pressed contact with the protuberances 1a formed on the vibration member 1 owing to a pressing spring 7. Here, the protuberances 1a should be formed together with the vibration member 1 as a unitary structure from the standpoint of transmitting vibration but may be separately formed using a different material. Further, the moving member 6 may have a unitary structure. Generally, however, the frictional slide portion relative to the protuberances 1a serves as an important element from the standpoint of motor characteristics and should, therefore, be composed of a special material that exhibits a high coefficient of friction, that wears little and that has rigidity effective to absorb vibration.

In the case of the standing-wave type ultrasonic motor of this structure, the vibration mode in the radial direction may be of the primary, secondary or tertiary mode. When the vibration mode is of the secondary or higher order, nodes of vibration develop concentrically even in the radial direction and the nodes may be supported at positions in addition to the center shaft portion. In decreasing the size and diameter of the motor, however, the resonance frequency increases with the increase in the number of the order of the vibration mode. When the motor has an outer diameter smaller than 10 mm, in particular, the primary mode is practical by taking the power source efficiency into consideration. In general, the primary mode tends to have a lower coefficient of electro-mechanical coupling than the secondary mode. In the case of the standing-wave type ultrasonic motor of this structure, however, favorable motor characteristics are exhibited particularly for light-load applications even when the size and diameter are decreased.

FIG. 14 illustrates a vibration member according to a sixth embodiment of the present invention, wherein FIG. 14(a) is a section view and FIG. 14(b) is a back plan view. Positional relationship of the piezoelectric element 2 and protuberances 1a for the vibration member 1 and the constitution are the same as those of the first embodiment of the present invention shown in FIG. 1. The embodiment in this case, however, is one in which the vibration member 1 is of the ring type instead of the disc type. When the vibration member 1 is of the ring type, difficulty is involved in regard to supporting the vibration member since it does not have a node at the central portion that is possessed by the disc-type member. In the case of the present invention based on the standing waves, however, the portions marked with a circle become nodal portions when the moving member is rotated in one direction only. These portions can be fixedly supported by a support mechanism 4 so that the present invention becomes very effective even for the case of the ring-type vibration member.

FIG. 15 illustrates a vibration member according to a seventh embodiment of the present invention, wherein FIG. 15(a) is a front plan view and FIG. 15(b) is a section view. According to this embodiment, the positional relationship of the piezo-electric element 2 and protuberances 1h, 1l for the vibration member 1 and the constitution are the same as those of the foregoing embodiment. Here, however, provision of high protuberances 1h and low protuberances 1l in the radial direction of the vibration member 1 makes it possible to simultaneously drive two moving members that are not shown by one vibration member 1 via two kinds of protuberances 1h and 1l. Here, the protuberances 1h, 1l may have the same height or may be provided in two or more kinds. In that case, many moving members can be driven by one vibration member 1. By changing the position and height of the protuberances, furthermore, various numbers of revolutions can be obtained for the moving members.

Figure 16A:
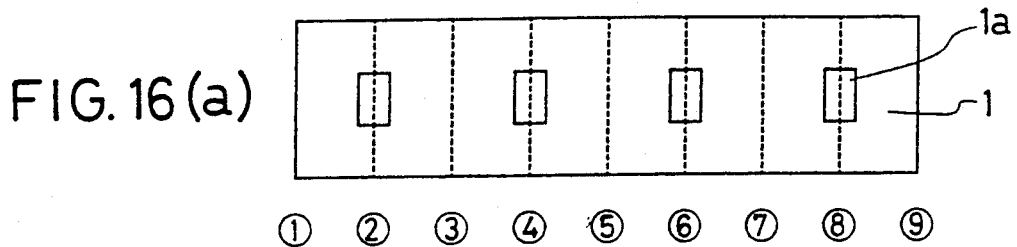
FIG. 16 is a diagram illustrating in cross section a vibration member of a linear-type ultrasonic motor according to an eighth embodiment of the present invention and the wiring therefor.
Figure 16B:
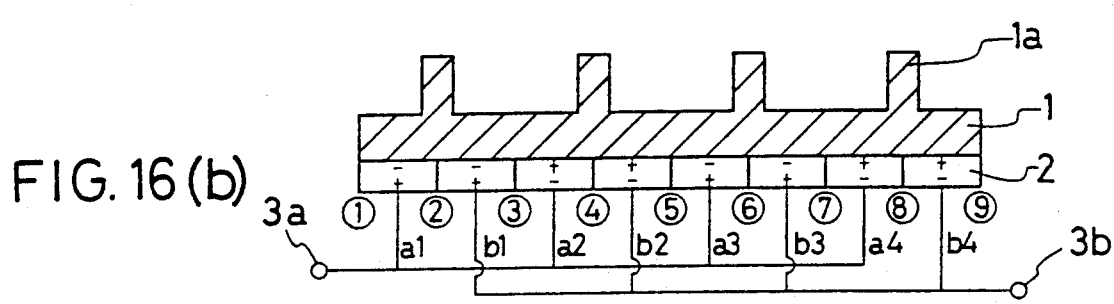

FIG. 16 is a diagram showing in cross section the wiring of a vibration member of a linear-type ultrasonic motor according to an eighth embodiment of the present invention, wherein FIG. 16(a) is a front plan view and FIG. 16(b) is a section view. This embodiment illustrates the case where the disc-type vibration member of the second embodiment shown in FIG. 4 is adapted to the linear-type one. Therefore, the principle of operation is the same as that of the disc-type one, and the description of FIGS. 5 to 6 can be directly applied. In FIG. 16, the piezo-electric element 2 has the shape of a flat plate that is joined to the vibration member 1 and is equally divided into eight segments which are denoted by a1, b1, a2, b2, -----, b4 in order and are polarized as shown. For easy explanation, furthermore, the boundaries of the segments are denoted by ①, ②, ---, ⑨ and protuberances 1a are provided at the boundaries ②, ④, ⑥, ⑧. The thus divided piezo-electric elements a1, a2, a3 and a4 are connected together by a lead wire 3a and the piezo-electric elements b1, b2, b3 and b4 are connected together by a lead wire 3b. A cyclic voltage from the cyclic voltage generating unit is applied to the lead wire 3a or to the lead wire 3b through switching means that is not shown such that standing-waves having phases deviated by 90 degrees are excited in the vibration member 1. Therefore, there is realized a standing-wave type ultrasonic motor which enables the moving direction of the moving member to be selectively switched to the right or to the left. Though the invention has described with an embodiment of the linear-type, it should be noted that the invention can also be easily adapted to even a zigzag type one in addition to the linear one.

Figure 17A:
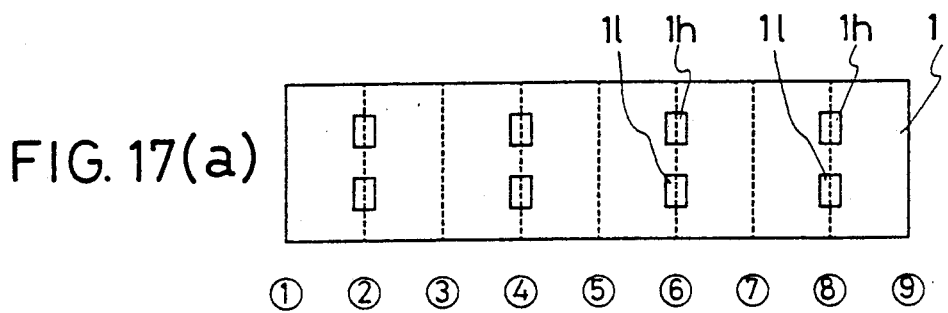
FIG. 17 is a diagram illustrating in cross section a vibration member according to a ninth embodiment of the present invention and the wiring therefor.
Figure 17B:
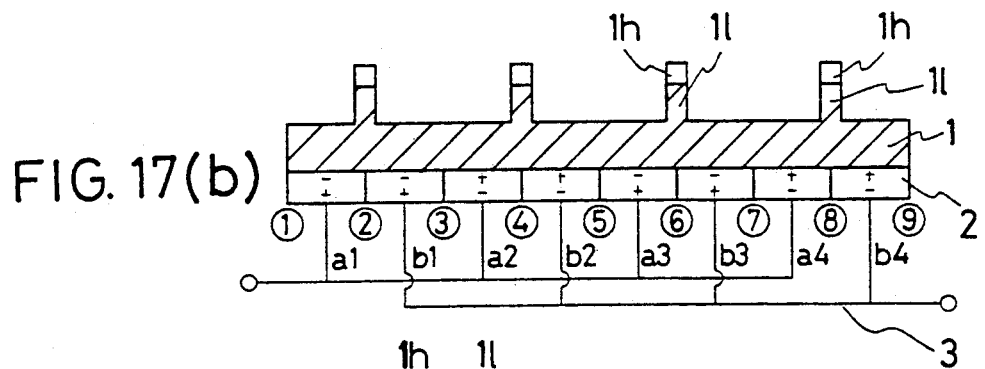
Figure 17C:
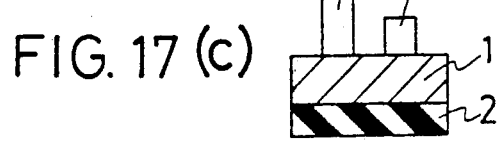

FIG. 17 is a diagram illustrating in cross section a vibration member according to a ninth embodiment of the present invention and the wiring thereof, wherein FIG. 17(a) is a front plan view, FIG. 17(b) is a section view, and FIG. 17(c) is a left side view. This embodiment explains the case where plural kinds of protuberances 1h, 1l are provided for the vibration member 1 of the linear-type ultrasonic motor that is shown in FIG. 16. Even in the case of the linear-type one like the one mentioned in conjunction with FIG. 15, it is possible to drive plural moving members using one vibration member. Here, when high protuberances and low protuberances 1( are provided, the moving members can be driven in the same direction but at different speeds. Moreover, when two kinds of protuberances are provided at different portions, e.g., when the protuberances 1h are provided on the boundaries ②, ④, ⑥, ⑧ and the protuberances 1l are provided on the boundaries ①, ③, ⑤, ⑦, the moving members can be driven in the opposite directions relative to each other.

Figure 18:
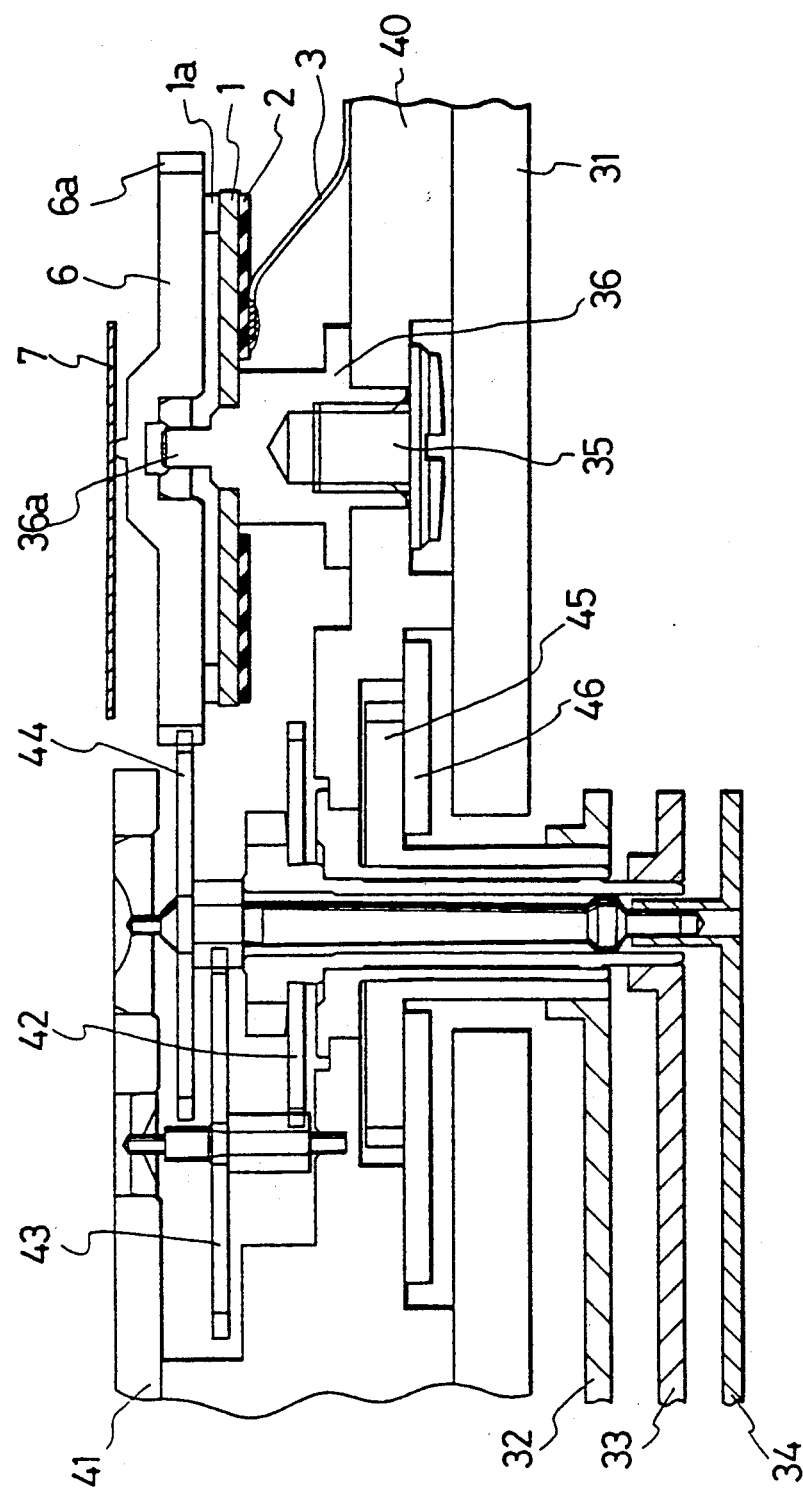
FIG. 18 is a vertical section view of a threehand analog electronic timepiece using the standingwave type ultrasonic motor of the present invention.

FIG. 18 is a vertical section view of an analog electronic timepiece using a standing-wave type ultrasonic motor according to the present invention.

The vibration member 1 having the piezo-electric element 2 adhered to the back surface thereof is fastened to a guide pin 36 which is fastened by a stop screw 35 to a main plate 40.

A plurality of protuberances 1a are provided on the upper surface of the vibration member 1, and the moving member 6 which is guided by the tip 36a of the guide pin 36 is rotatably incorporated on the protuberances 1a being pressed by the force of a pressing spring 7.

A predetermined cyclic voltage is applied to the piezo-electric element 2 from a drive control circuit that is not shown via a lead wire 3 connected to the piezo-electric element 2, whereby the vibration member 1 undergoes deformation and the moving member 6 is rotated at a predetermined speed due to deformation of the protuberances 1a.

A moving member gear 6a formed along the periphery of the moving member 6 rotates a fourth wheel 44 and further rotates a third wheel 43, a minute wheel 42, another minute wheel that is not shown, and an hour wheel 45 at predetermined speeds.

If the period of the cyclic voltage applied to the piezo-electric element 2 and the numbers of teeth of the gears are suitably selected, the hours are indicated by an hour hand that is attached to the hour wheel, the minutes are indicated by a minute hand that is attached to the minute wheel, and the seconds are indicated by a second hand attached to the fourth wheel.

In addition to being indicated by a train of a plurality of wheels and the hands as described above, the time data can also be indicated by attaching hands or pointer needles directly to the moving member 6. Namely, the time can be viewed from the side of the dial 31 in FIG. 18 as well as from the side of the pressing spring 7.

By adjusting the frequency of the cyclic voltage applied to the piezo-electric element 2, furthermore, the second hand 34 can be stepwisely moved for every second or can be continuously moved.

Figure 19:
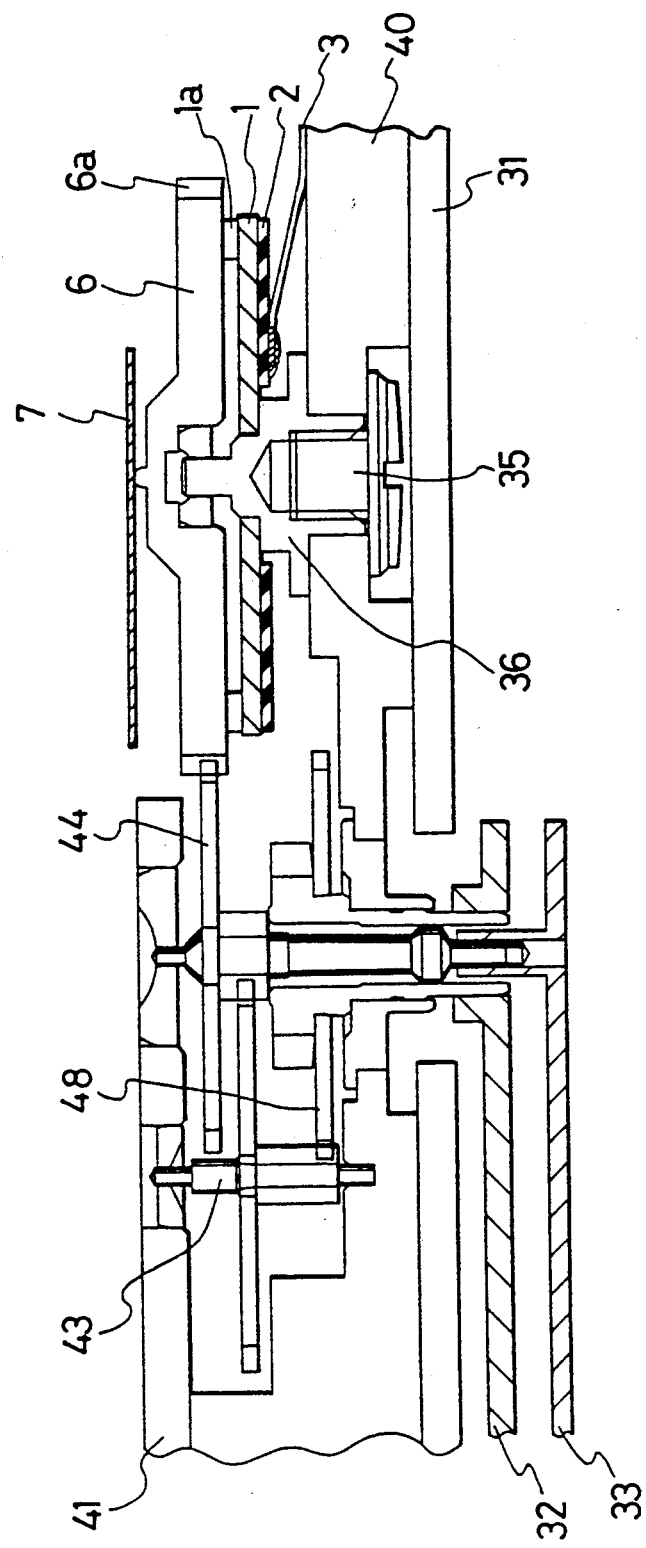
FIG. 19 is a vertical section view of a twohand analog electronic timepiece using the standingwave type ultrasonic motor of the present invention.
Figure 20:
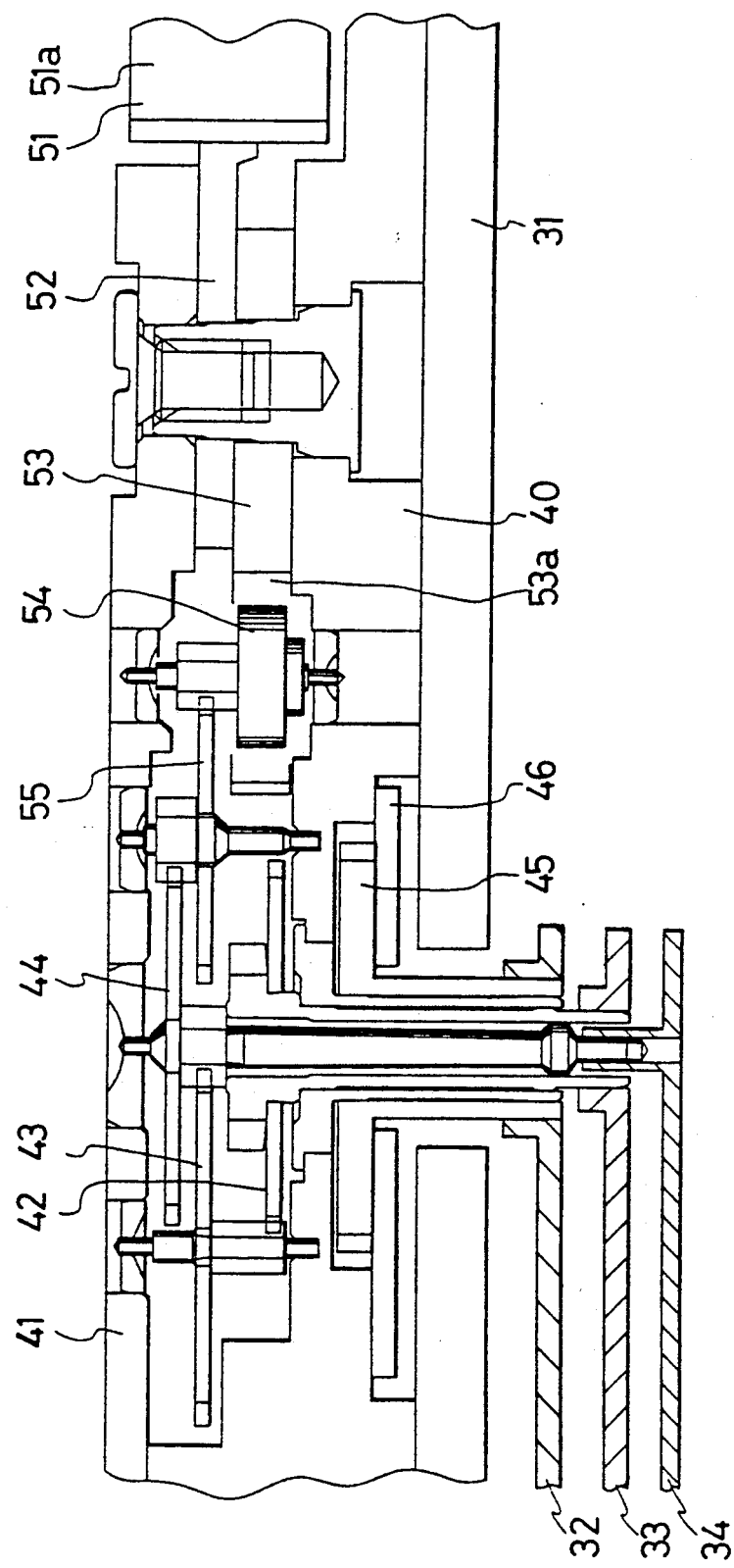
FIG. 20 is a vertical section view showing a conventional analog electronic timepiece.

FIG. 19 is a vertical section view of a twohand analog electronic timepiece using a standingwave type ultrasonic motor according to the present invention. The rotational movement of the moving member gear 6a is transmitted to the fourth wheel 44, to the third wheel 43 and to the second wheel 45, and the minutes are indicated by a minute hand 33 attached to the fourth wheel and the hours are indicated by an hour hand 32 attached to the second wheel. The two-hand timepiece can be easily obtained by simply exchanging some of the parts of the three-hand timepiece of FIG. 18 and in a reduced thickness. According to the present invention as described above, protuberances are provided at nearly every other intermediate position of the loops and the nodes of standing-waves that are generated in the vibration member by the piezo-electric effect or the electrostrictive effect of the piezo-electric element or the electrostrictive element, and the moving member is simply brought into pressed contact with the protuberances so as to be frictionally driven, in order to obtain effects as described below.

(1) The motor can be driven forward and reverse.
(2) Owing to the constitution of the piezoelectric element or the electrostrictive element, there is no need of using plural piezo-electric elements or electrostrictive elements. By simply switching the piezoelectric element or the electrostrictive element to which a high frequency signal is to be applied, the motor can be driven forward or reverse. Therefore, only one booster circuit and one drive circuit are used, and the motor as a whole is constructed in a small size even including the control circuit.
(3) The moving member is frictionally driven by the protuberances provided nearly at intermediate positions of the loops and the nodes of the standing waves. Therefore, stable motor performance is obtained even for a change in the pressing force compared with the case of the progressive-wave type one in which the moving member comes in contact with the loops at all times.
(4) There exist two protuberances that come in contact with the moving member for a wave length of the standing wave. Therefore, the motion of the protuberances are efficiently converted as a drive force without working as brake even for the coarse contact surface of the moving member or the swell thereof, contributing to obtain stable motor performance maintaining high efficiency.
(5) Since the structure is very simple, the motor is obtained in a reduced size and in a reduced diameter.

Furthermore, the analog electronic timepiece using the standing-wave type ultrasonic motor of the present invention needs none of coil block, stator, rotor, fifth wheel and the like that have heretofore been used. Therefore, there is realized an analog timepiece which is small in size and thin. By changing some parts, there can be obtained a three-hand timepiece or a two-hand timepiece, and the hands can be moved continuously or stepwisely.

What is claimed is:

1. A standing-wave type ultrasonic motor utilizing flexible standing waves generated in a vibration member for rotating a moving member, comprising:
   an elastic vibration member;
   a fixture means for fixing said standing-wave type ultrasonic motor, said fixture means having a supporting means for supporting said vibration member;
   a piezo-electric element or an electrostrictive element provided on said vibration member for generating flexible standing waves having loops and nodes in said vibration member;
   electrode patterns attached to said piezo-electric element or said electrostrictive element on one plane thereof, said electrode patterns each being arranged in multiples of 4 and being polarized such that the direction of polarization is alternately reversed for each pair of two neighboring electrode patterns;
   connecting means for electrically connecting together alternate ones of said electrode patterns to form two electrode pattern groups;
   a moving member rotatably disposed on said vibration member;
   protuberances on said vibration member and disposed at every other one of the intermediate positions between the loops and the nodes of said flexible standing waves, said protuberances being located at every other one of the boundaries of said electrode patterns; and
   a pressure-regulator for maintaining suitable contact pressure between said moving member and said vibration member.

2. A standing-wave type ultrasonic motor as claimed in claim 1; wherein said vibration member has a shape of a disc.

3. A standing-wave type ultrasonic motor as claimed in claim 1; wherein said vibration member is made of an elastic material.

4. A standing-wave type ultrasonic motor as claimed in claim 2; wherein said center shaft is made of an electrically conductive material.

5. A standing-wave type ultrasonic motor as claimed in claim 1; wherein said vibration member has a shape of a ring.

6. A standing-wave type ultrasonic motor as claimed in claim 1; wherein said supporting means supports said vibration member at the nodal portions thereof.

7. A standing-wave type ultrasonic motor as claimed in claim 1; wherein said vibration member has plural ranks of said protuberances in the radial direction of said vibration member.

8. A standing-wave type ultrasonic motor as claimed in claim 7; including plural moving members provided on said vibration member.

9. A standing-wave type ultrasonic motor as claimed in claim 8; wherein said protuberances all have the same height.

10. A standing-wave type ultrasonic motor as claimed in claim 8; wherein said protuberances have at least two different heights.

11. A standing-wave type ultrasonic motor utilizing flexible standing waves generated in a vibration member for reciprocating a moving member, comprising:
   an elastic vibration member;
   a fixture means for fixing said standing-wave type ultrasonic motor, said fixture means having a supporting means for supporting said vibration member;
   a piezo-electric element or an electrostrictive element provided on said vibration member for generating flexible standing waves having loops and nodes in said vibration member;
   electrode patterns attached to said piezo-electric element or said electrostrictive element on one plane thereof, said electrode patterns each being arranged in multiples of 4 and being polarized such that he direction of polarization is alternately reversed for each pair of two neighboring electrode patterns;

connecting means for electrically connecting together alternate ones of said electrode patterns to form two electrode pattern groups;

a moving member reciprocably deposed on said vibration member;

protuberances on said vibration member and disposed at ever other one of the intermediate positions of the loops and the nodes of said flexible standing waves, said protuberances being located at every other one of the boundaries of said electrode patterns; and a pressure-regulator for maintaining suitable contact pressure between said moving member and said vibration member.

12. A standing-wave type ultrasonic motor as claimed in claim 11; wherein said vibration member is made of an elastic material.

13. A standing-wave type ultrasonic motor as claimed in claim 11; wherein said vibration member has plural parallel ranks of said protuberances.

14. A standing-wave type ultrasonic motor as claimed in claim 13; including plural moving members provided on said vibration member.

15. A standing-wave type ultrasonic motor as claimed in claim 14; wherein said protuberances all have the same height.

16. A standing-wave type ultrasonic motor as claimed in claim 14; wherein said protuberances have at least two different heights.

17. A standing-wave type ultrasonic motor as claimed in claim 1; further comprising a second piezo-electric element or electrostrictive element provide on said vibration member for generating flexible standing waves in said vibration member.

18. A standing-wave type ultrasonic motor as claimed in claim 17; wherein said piezo-electric elements or electro-strictive elements have electrode patterns on at least a pair of regions thereof and arranged in a manner that the direction of polarization of each of the regions is alternately reversed.

19. A standing-wave type ultrasonic motor as claimed in claim 18; further comprising coupling means for short circuiting all of said electrode patterns for each of said two piezo-electric elements or electrostrictive elements.

20. A standing-wave type ultrasonic motor as claimed in claim 19; wherein said two piezo-electric elements or electrostrictive elements are so arranged that the boundary of the regions of the one piezo-electric element or electrostrictive element is positioned near the center of the region of the other one; and said protuberances are arranged on the boundaries of the regions of either one of said piezo-electric element or electrostrictive element.

21. A standing-wave ultrasonic motor as claimed in claim 22; further comprising switching means for selecting the phase of a cyclic voltage applied to the piezo-electric element or the electrostrictive element that has said protuberances arranged on the boundary of said regions to be in phase or in opposite phase for the piezo-electric element or the electrostrictive element having said protuberance arranged at the center of the region between said two piezo-electric elements or the electrostrictive elements; and cyclic voltage generating means connected to said coupling means via said switching means.

22. A standing-wave type ultrasonic motor as claimed in claim 1; including cyclic voltage generating means for generating a cyclic voltage; and switching means for selectively applying the cyclic voltage to each of the two electrode pattern groups.

23. A standing-wave type ultrasonic motor as claimed in claim 11; including cyclic voltage generating means for generating a cyclic voltage; and switching means for selectively applying the cyclic voltage to each of the two electrode pattern groups.

24. A standing-wave motor comprising: a flexible vibratory member operative when vibrationally excited to generate standing waves having prescribed nodal and antinodal points; a movable member disposed on the vibratory member; a plurality of motion-converting members interposed between the vibratory and movable members for converting the standing waves generated in the vibratory member into motion of the movable member; and exciting means responsive to electrical signals for vibrationally exciting the vibratory member to cause the same to generate standing waves, the exciting means comprising a plurality of electrodes connected to the vibratory member, the electrodes being electrically connected to form two electrode groups with the electrodes in one group being alternately disposed with respect to the electrodes in the other group relative to the vibratory members to define neighboring pairs of electrodes with each neighboring pair containing one electrode from each of the two electrode groups, and the electrodes being electrically polarized such that each neighboring pair of electrodes has the same polarization which is opposite to that of immediately adjacent neighboring pairs of electrodes.

25. A standing-wave motor according to claim 24; wherein the motion-converting members are positioned at alternate boundary regions of the electrodes.

26. A standing-wave motor according to claim 25; wherein the motion-converting members are positioned in between the nodal and antinodal points of the standing waves.

27. A standing-wave motor according to claim 25; wherein the vibratory member has two opposed major surfaces, the two electrode groups being disposed on respective ones of the major surfaces such that each neighboring pair of electrodes is comprised of one electrode on each major surface.

28. A standing-wave motor according to claim 24; wherein the vibratory member has two opposite major surfaces, the two electrode groups being disposed in alternate relation on the same major surface such that each neighboring pair of electrodes is comprised of two adjacent electrodes.

29. A standing-wave motor according to claim 24; wherein the movable member comprises a rotatable member mounted to undergo bidirectional rotation in response to standing waves generated in the vibratory member.

30. A standing-wave motor according to claim 24; wherein the movable member comprises a reciprocable member mounted to undergo reciprocation in response to standing waves generated in the vibratory member.

31. A standing-wave motor according to claim 24; wherein the number of electrodes in each electrode group is a multiple of 4.

* * * * *